(12) United States Patent
Kodialam et al.

(10) Patent No.: US 8,959,091 B2
(45) Date of Patent: Feb. 17, 2015

(54) KEYWORD ASSIGNMENT TO A WEB PAGE

(75) Inventors: Muralidharan Sampath Kodialam, Marlboro, NJ (US); Sarit Mukherjee, Marlboro, NJ (US); Limin Wang, Plainsboro, NJ (US); Sunghwan Ihm, Princeton, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 263 days.

(21) Appl. No.: 12/512,702

(22) Filed: Jul. 30, 2009

(65) Prior Publication Data

US 2011/0029511 A1 Feb. 3, 2011

(51) Int. Cl.
*G06F 17/30* (2006.01)

(52) U.S. Cl.
CPC .... *G06F 17/30882* (2013.01); *G06F 17/30722* (2013.01); *G06F 17/30864* (2013.01)
USPC ............................ 707/741; 707/723; 707/748

(58) Field of Classification Search
CPC ................... G06F 17/30867; G06F 17/30905; G06F 17/30749; G06F 17/30761; G06F 17/30035; G06F 17/30864; G06F 17/30722; G06F 17/30882
USPC .......................................... 707/723, 741, 748
See application file for complete search history.

(56) References Cited

U.S. PATENT DOCUMENTS

| | | | |
|---|---|---|---|
| 5,857,179 A * | 1/1999 | Vaithyanathan et al. ............. | 1/1 |
| 6,651,059 B1 * | 11/2003 | Sundaresan et al. .................. | 1/1 |
| 6,684,205 B1 | 1/2004 | Modha et al. | |
| 6,728,752 B1 * | 4/2004 | Chen et al. ..................... | 709/203 |
| 6,862,586 B1 * | 3/2005 | Kreulen et al. ........................ | 1/1 |
| 8,166,021 B1 * | 4/2012 | Cao et al. ....................... | 707/713 |
| 8,166,045 B1 * | 4/2012 | Mazumdar et al. ........... | 707/748 |
| 2002/0024532 A1 * | 2/2002 | Fables et al. .................. | 345/700 |
| 2003/0221163 A1 | 11/2003 | Glover et al. | |
| 2006/0026496 A1 * | 2/2006 | Joshi et al. ................. | 715/500.1 |
| 2006/0085766 A1 * | 4/2006 | Dominowska et al. ....... | 715/854 |
| 2006/0136378 A1 * | 6/2006 | Martin .............................. | 707/3 |
| 2007/0299815 A1 * | 12/2007 | Starbuck et al. ................... | 707/3 |
| 2008/0162528 A1 * | 7/2008 | Jariwala ........................ | 707/102 |
| 2008/0313170 A1 * | 12/2008 | Kamen ............................. | 707/5 |
| 2010/0131563 A1 * | 5/2010 | Yin ................................ | 707/794 |
| 2011/0225019 A1 * | 9/2011 | Taylor et al. ................. | 705/7.28 |

FOREIGN PATENT DOCUMENTS

| CN | 1227657 A | 9/1999 |
|---|---|---|
| CN | 1519752 A | 8/2004 |

(Continued)

OTHER PUBLICATIONS

International Search Report and the Written Opinion of the International Searching Authority, or the Declaration in PCT/US2010/042496, Alcatel-Lucent USA Inc., Applicant, dated Sep. 23, 2010, 13 pages.

(Continued)

*Primary Examiner* — Shew-Fen Lin
(74) *Attorney, Agent, or Firm* — Wall & Tong, LLP

(57) ABSTRACT

A method, system and apparatus for a assigning keywords to a web page using keyword data from the web page itself, web pages having links pointing to the web page, and web pages pointed to by a link in the web page, wherein the keyword data from the multiple web pages is processed to provide a relevant set of keyword data for the web page.

19 Claims, 6 Drawing Sheets

(56) References Cited

FOREIGN PATENT DOCUMENTS

JP       2004-78446     3/2004
JP       2007-87157     4/2007

OTHER PUBLICATIONS

Chakrabarti et al., "Enhanced Hypertext Categorization Using Hyperlinks," vol. 27, No. 2, Jun. 1, 1998, pp. 307-318, XP002302916.

Wei Xie et al., "Using Links to Aid Web Classification," Computer and Information Science, 2007. ICIS 2007. 6th IEEE/ACIS Int. Conf. on, IEEE, PI, Jul. 1, 2007, pp. 981-986, XP031119246.

Hirano T., "Detection of Errors of English Article Using a Search Engine," *The Japanese Database Society Letters*, The Japanese Database Society, Japan, Dec. 2007, vol. 6, No. 3, pp. 1-4.

Ohshika, et al., "Configuration of Translation Support System Using a Search Engine," *The Institute of Electronics, Information and Communication Engineers Technical Research Report*, Information and Communication Engineers, Jul. 7, 2004,, vol. 104, No. 177, pp. 237-242.

Notice of Reason for Refusal in Japanese Patent Application Serial No. 2012-522891, Drafting Date Jul. 2, 2013.

Office Action mailed Jan. 25, 2013 in CN Patent Application No. 201080034039.5, Alcatel-Lucent, Applicant, 5 pages.

Translation of Chinese Office Action for Chinese Application Serial No. 201080034039.5, mailed Jul. 22, 2013, consists of 5 unnumbered pages.

* cited by examiner

KEYWORD ASSIGNMENT TO A WEB PAGE

FIELD OF THE INVENTION

The invention generally relates to the field of web page classification and, more specifically, to classifying web pages according to relevant key words.

BACKGROUND

Keyword assignment to a web page is a crucial step for web page classification and search. The keywords must be representative enough to capture the information contained in the page and must be common and socially acceptable enough to be of practical use (e.g., identifying a relevant web page to a user according to user provided search keywords).

Usually a web page contains a few keywords that are assigned to it by the designer. For example, keywords may be found under HTML tags "title" or meta tags "keyword" or "description." These keywords are not necessarily acceptable enough to be of practical use since different web designers assign them differently and to serve different purposes.

There are several different techniques that may be used for keyword assignment to a web page. In an artificial intelligence-based technique, an algorithm analyzes a web page to learn the characteristics of the web page and correspondingly assign keywords to the web page. This algorithm improves with the number of web pages analyzed. In a data mining based technique, an algorithm looks for trends within the data present in a page and then identifies key attributes to the page. In a keyword density-based technique, an algorithm sorts through the words that are present in a web page and assigns keywords to the web page based on the density function obtained.

These techniques are computationally intensive and require large storage space per page due to the need to analyze page content. In addition, any modification in page content necessitates a reanalysis of the entire page. Further, since these techniques depend on the content of the page, they are not suitable for keyword assignment to a web page having few words, such as pages that are dynamically constructed using JavaScript, such as a Google™ Map page.

SUMMARY

Various deficiencies of the prior art are addressed by the present invention of a method, system and apparatus for assigning keywords to a web page using keyword data from the web page itself, web pages having links pointing to the web page, and web pages pointed to by a link in the web page, wherein the keyword data from the multiple web pages is processed to provide a relevant set of keyword data for the web page.

One embodiment of a method for assigning keywords to a web page comprises: identifying self keywords associated with the web page, the self keywords comprising keyword data from the web page; identifying in-link keywords associated with the web page, the in-link keywords comprising keyword data from other web pages including a link to the web page; identifying out-link keywords associated with the web page, the out-link keywords comprising keyword data from other web pages having a link to them from the web page; and combining the self, in-link and out-link keywords to form a set of keywords for the web page. In addition, the sets of self, in-link and out-link keywords may be further processed to provide respective rank ordered sets of self, in-link and out-link keywords. In addition, one or more of the heuristic functions may be used to determine a relative importance of each keyword within the self, in-link and out-link keywords sets.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be primarily described within the context of a method, system and apparatus for assigning keywords to specific web pages using data from the specific web pages, other web pages having links therein pointing to the specific web page, and other web pages pointed to by links in the specific web pages. Multiple web pages may be iteratively processed to enhance the relevancy of their respective keywords. A web page keyword database may be formed in which the keywords associated with multiple web pages, possibly all available web pages, is provided such that high speed searching of the keyword database is provided within the context of search algorithms, classification algorithms and the like. Those skilled in the art and informed by the teachings herein will realize that the embodiments are applicable to numerous other applications, such as web page classification (by assigning keywords to multiple web pages), user tracking (by examining keywords of pages visited by a user) and the like.

Usually a web page contains a few keywords that are assigned to it by the designer. For example, keywords may be found within a web page by examining HTML tags such as a "title" or other HTML tags, or by examining meta tags such as a "keyword" tag or a "description" tag. Various embodiments utilize these keywords within the context of iterative and non-iterative methodologies for assigning keywords to a particular web page. It is noted that the embodiments operate to assign keywords to a web page even if that web page or related web pages do not include keyword related tags.

Generally speaking, methods, systems and apparatus according to the various embodiments assign keywords to a particular web page by retrieving keywords from that web page (denoted herein as the "self" web page), those web pages with links pointing to the self web page (denoted herein as "in-link" web pages) and those web pages pointed to by the self web page (denoted herein as "out-link" web pages).

Figure 1:
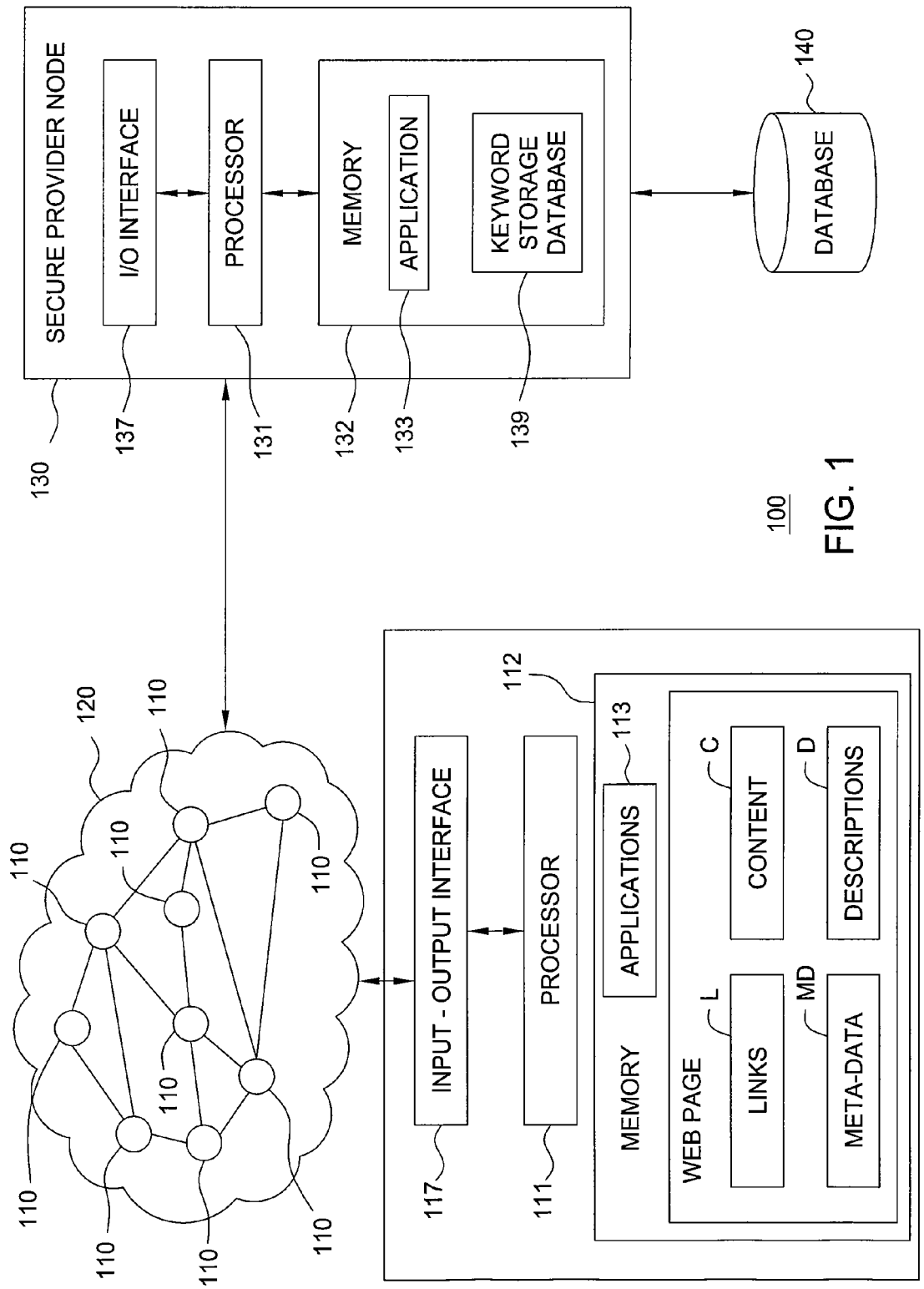
FIG. 1 depicts a high-level block diagram of a networked computer system useful in understanding the present embodiments.

FIG. 1 depicts a high-level block diagram of a networked computer system useful in understanding the present embodiments. Specifically, a plurality of network elements or nodes 110 are interconnected in a standard manner to form a network 120, such as the Internet. The various network elements or nodes include hardware and software components adhering to various protocols supporting common or uniform addressing of web pages, streaming media and the like. Within the context of the present invention, the discussion will be limited to web pages using hypertext markup language (HTML), extensible markup language (XML), uniform resource locator (URL) and other standardized protocols understood by those familiar with the World Wide Web.

For purposes of this discussion, it will be assumed that each of the network elements or nodes 110 comprises a general-purpose computer, though special-purpose computers and/or other devices (e.g., routers, bridges, switches and the like) may also be employed within the context of the various embodiments. The operational details of the general-purpose computers discussed herein are only briefly described. Each of the general-purpose computers 110 communicates with one or more of the other general-purpose computers 110 within the network 120. One or more of the general-purpose computers 110 executes software instructions which implement thereby the methodologies, systems and techniques discussed herein with respect to the various embodiments.

A general-purpose computer 110 is depicted as including a processor 111, input-output interface 117 and memory 112. The processor 111 is coupled to each of the memory 112 and input-output interface 117. The input-output interface 117 is adapted to facilitate communications with other node or network elements within the network 120.

The memory 112 of the general-purpose computer 110 is depicted as including data associated with applications 113 and data associated with a web page 114. It should be noted that while only one web page is depicted, multiple instances of web pages may be supported within the context of the memory 114 of the general-purpose computer 110. Moreover, it should be noted that the presence of a web page within the memory of the general-purpose computer 110 is not necessary to implement the various embodiments. The applications 113 include software instructions which, when executed by the processor 111, perform the various steps discussed herein with respect to the various embodiments.

The web page 114 is depicted as including content C, metadata MD, descriptions D and links L. The content C may comprise any text, image or other content data. The metadata MD and descriptions D may comprise any standard or non-standard information pertaining to the web page, such as discussed herein with respect to the various embodiments. The links L comprise, illustratively, URL or other types of links that point to other web pages.

A service provider node 130 is depicted as including a processor 131, input-output interface 137 and the memory 132. The processor 131 is coupled to each of the memory 132 and input-output interface 137. The input-output interface 137 is adapted to facilitate communications with other node or network elements within the network 120, such as the general-purpose computer 110 described above. The service provider node comprises, illustratively, a node supporting a server and/or management function that is in communication with multiple nodes via the network 120. Generally speaking, any server, client or other device may perform the various functions described herein with respect to the embodiments. Moreover, multiple servers, clients and/or other devices may work in parallel to more rapidly perform the various functions. For example, one device may be adapted to update inlink lists while another device is adapted to update outlink lists. Additional servers may be employed to updated either list as the number of web pages to be processed grows.

The memory 132 of the service provider node 130 is depicted as including data associated with applications 133 and data associated with a keywords storage database 139. The applications 133 include software instructions which, when executed by the processor 111, perform the various steps discussed herein with respect to the various embodiments. The keyword assignment database 139 comprises a database in which keyword data associated with one or more web pages is stored. The keyword assignment database 139 is depicted as being a component of the exemplary service provider node 130. However, it will be appreciated by those skilled in the art that the keyword assignment database 139 may be a remote with respect to processing circuitry (such as service provider node 130) operating in accordance with the various embodiments. In one embodiment, an external database 140 is provided to store keyword information associated with webpages.

Generally speaking, methods described herein with respect to the various embodiments are executed within the service provider node 132 extract keyword data associated with webpages within a portion of or (ideally) all of the nodes 110 within the network 120. Thus, in various embodiment, keywords storage database 139 and/or database 140 is used to store keyword data associated with each of the webpages 114 supported or hosted by the various nodes 110 within the network 120. As such, one embodiment comprises a network management system (NMS), network administration system, service provider node or other network or management element executing software to calculate the various parameters discussed below with respect to the embodiments. Supporting hardware/software elements of these embodiments are discussed herein with respect to the various figures.

Figure 2:
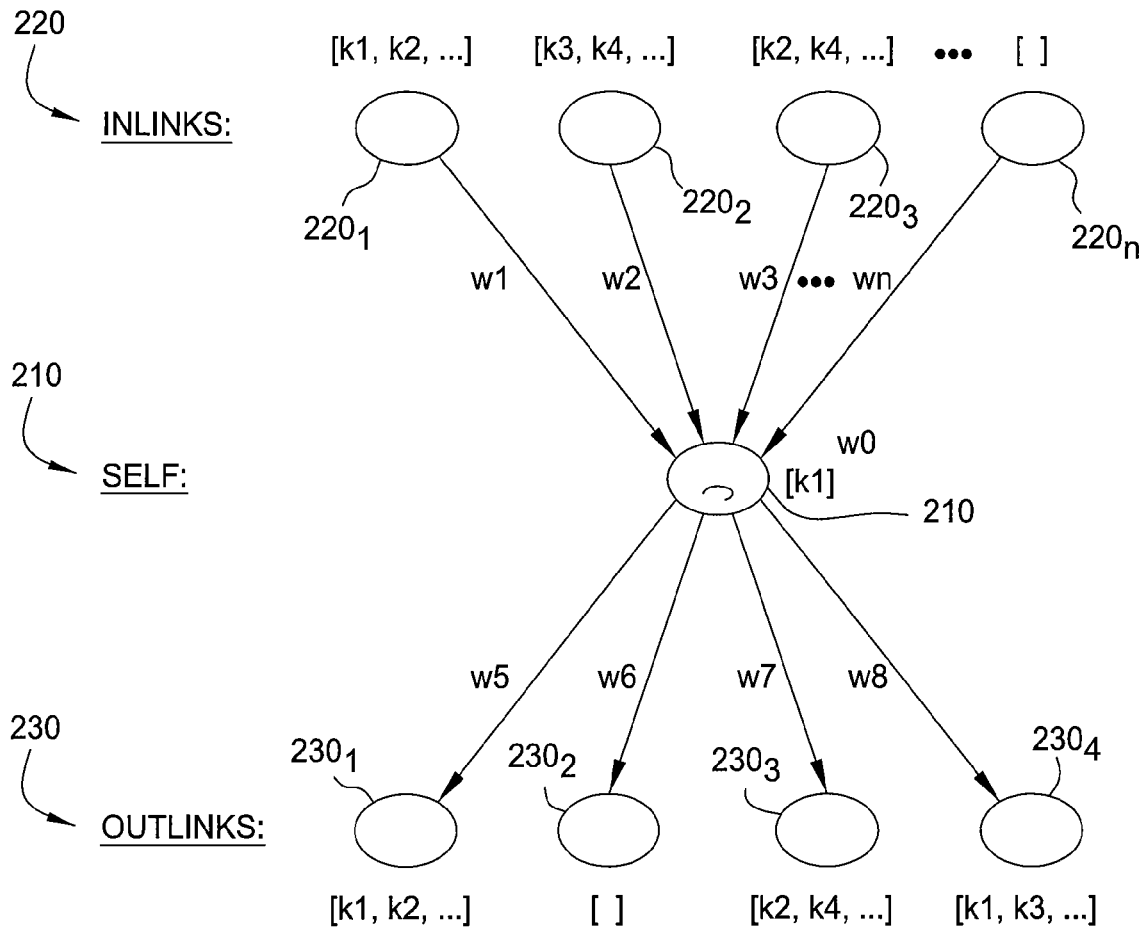
FIG. 2 graphically depicts keyword relationships between linked web pages.

FIG. 2 graphically depicts keyword relationships between linked web pages. Specifically, FIG. 2 graphically depicts a self web page 210, a plurality of in-link web pages $220_1$, $220_2$, $220_3$ and so on up to $220_n$ (collectively in-link web pages 220), and a plurality of out-link web pages $230_1$, $230_2$, $230_3$ and so on up to illustratively $230_4$ (collectively out-link web pages 230).

The self web page 210 comprises the web page being processed to determine keyword assignment. The in-link web pages 220 comprise of those web pages including a link such as an HTML, XML, href or other link or addressing mechanism that points towards the self page, addresses the self page, or redirects a user to the self page. The out-link web pages 230 comprise those web pages that are pointed to or otherwise addressed by HTML, XML, href or other link or addressing mechanism within the self page.

The self page 210 may have associated with it one, more than one or no respective keywords. In the depiction of FIG. 2, the self page 210 has associated with it a respective set of keywords [k1]. The sets of self page keywords has associated with it a respective weight, depicted as weight w0.

Each in-link web page 220 may have associated with it one, more than one or no respective keywords. For example, in-link web page $220_1$ has associated with it a respective set of keywords [k1, k2 . . . ], in-link web page $220_2$ has associated with it a respective set of keywords [k3, k4 . . . ], in-link web page $220_3$ has associated with it a respective set of keywords [k2, k4 . . . ], and in-link web page $220_n$ has associated with it a respective set of keywords in which the set comprises a NULL set (i.e., no keywords). Each of the sets of in-link web page keywords has associated with it a respective weight w, depicted as weights w1 through wn.

Each out-link web page 230 may have associated with it one, more than one or no respective keywords. For example, out-link web page $230_1$ has associated with it a respective set of keywords [k1, k2 ... ], out-link web page $230_2$ has associated with it a respective NULL set of keywords [ ], out-link web page $230_3$ has associated with it a respective set of keywords [k2, k4 ... ], and out-link web page $230_4$ has associated with it a respective set of keywords [k1, k3, ... ].). Each of the sets of out-link web page keywords has associated with it a respective weight w, depicted as weights w5 through w8.

To form a set of keywords to be assigned to the self web page 210, the original self web page keywords, in-link web page keywords and the out-link web page keywords are collected and processed according to various embodiments to form, illustratively, a rank order of keywords associated with the self node. This collection and processing of keywords may be iterated for each of a plurality of self nodes (e.g., the in-link and out-link nodes) such that these additional nodes also include respectively collected/processed keywords listed in rank order. This methodology may comprise a continuous process in which the keywords or rank ordered keywords associated with any particular self node are continually changing and/or improving in terms of their relevancy to that self node. For example, the in-link web page associated with any particular self web page will almost certainly change over time as more (or fewer) web pages point to that particular self web page. Thus, in various embodiments, the methodologies presented herein provide representative keyword set assignments for web pages wherein the assigned keyword sets may be continually improved and expanded upon.

Generally speaking, webpages typically include content and non-content portions. Either of the content or non-content portions may include text suitable for use as keywords within the context of the present embodiments. In reduced complexity embodiments (i.e., those embodiments utilizing fewer computational resources), only text included within non-content portions of a webpage are included within keyword sets. In more complex embodiments (i.e., those embodiments less concerned with computational resource demands), text included within content portions of the webpage may also be included within the keyword sets associated with the webpages.

Figure 3:
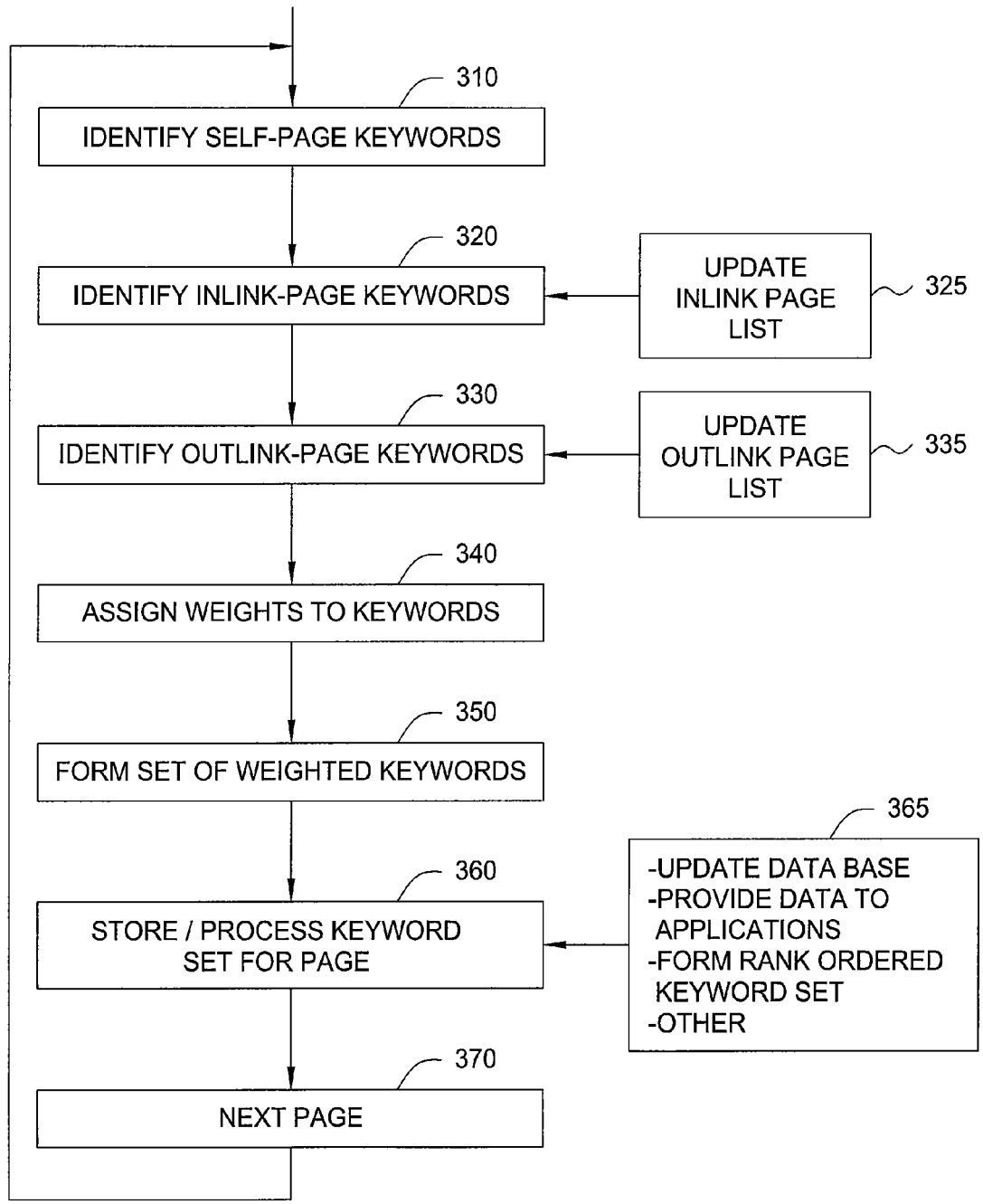
FIG. 3 depicts a flow diagram of a method for assigning keywords to a web page according to one embodiment.

FIG. 3 depicts a flow diagram of a method for assigning keywords to a web page according to one embodiment. Specifically, the method 300 of FIG. 3 is adapted to generate a keyword set associated with one or more self pages. The method 300 of FIG. 3 may be repeated for one or more web pages as desired.

At step 310, self page keywords are identified. That is, keywords within the web page being processed for keyword assignment are identified.

At step 320, in-link page keywords are identified. That is, keywords within web pages having links that point to the web page being processed for keyword assignment are identified. Referring to box 325, the list of in-link pages is optionally updated. Such updating may comprise invoking a search engine, Web crawler or other mechanism to identify those web pages including links that point to the web page being processed. For example, assuming that a self web page denoted as www.example.com is to be processed, a list of all of the web pages that link to the self web page may be formed over time by crawling the web or by utilizing search engines such as Yahoo or Google using the search term "link:www.example.com". The resulting list of web pages (denoted as Inlink_list) provides the address/identification information associated with the web pages from which in-link keyword data pertaining to the self page is retrieved. In one embodiment, the in-link web pages in the Inlink_list is rank ordered according to a strength, relevancy or other ranking paradigm.

In further embodiments, only keywords from a predefined number of ranked in-link web pages is used to supply keywords.

At step 330, out-link page keywords are identified. That is, keywords within web pages that are pointed to by links within the web page being processed for keyword assignment are identified. The Outlink_list may be obtained by analyzing the source file of the self page (e.g., www.example.com) and collecting the href data within the page, though href data associated with an image page may be disregarded from the Outlink_list since the image page may not have any useful text content. Referring to box 335, the list of out-link pages (denoted as Outlink_list) is optionally updated. Such updating may comprise examining the self web page to determine if any changes/updates to out-links have occurred. The Outlink_list provides the address/identification information associated with the web pages from which out-link keyword data pertaining to the self page is retrieved.

In one embodiment, each page identified within the Inlink_list and Outlink_list is processed to form a respective Keyword_set for display, such as discussed above with respect to the graphically depicted keyword relationships between linked web pages shown with respect to FIG. 2.

An embodiment for identifying keywords suitable for use in steps 310, 320 and 330 herein is discussed in more detail below with respect to FIG. 4

At step 340, weights are assigned to the identified keywords. Various weighting techniques may be employed within the context of the present invention. In one embodiment, each keyword is assigned the same weight. In another embodiment, the weight of a keyword is adapted in response to the strength of the web page from which the key word is derived. Other weighting schemes will be discussed in more detail below. In another embodiment, the weight of a keyword is based upon the link of the keyword to the web page (i.e., self, in-link or out-link), wherein different links may be associated with the same or different weights.

At step 350, a set of weighted keywords is formed for the self web page. That is, a set of weighted keywords to be associated with the self page is formed using the weighted keywords derived from the self page, in-link pages and out-link pages.

At step 360, the set of weighted keywords associated with the self page is stored and/or processed as desired. Referring to box 365, step 360 may comprise updating a database, providing data to applications, forming a rank ordered keywords and/or other processing/storage operations. In one embodiment described below with respect to FIG. 5, rank ordered keywords for a web page are generated utilizing Count, Unique Count and Weighted Unique Count heuristic functions. A subset of the ranked ordered keyword (e.g., the top M keywords) is then assigned to the self web page. Other functions may also be used within the context of the various embodiments.

At step 370, a next page to be processed as the self page is selected and the method 300 is repeated for the new selected self page.

Figure 4:
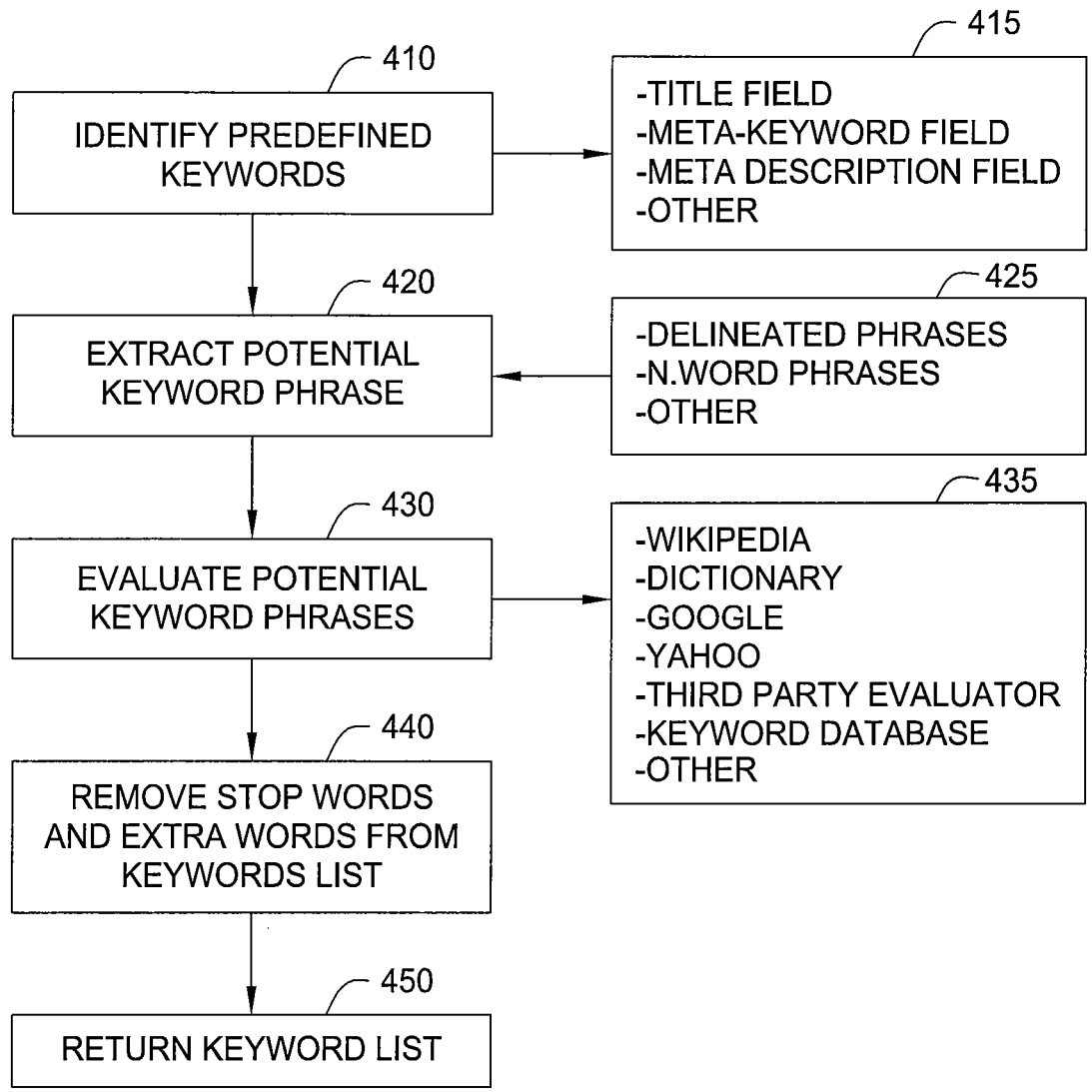
FIG. 4 depicts a flow diagram of a method of identifying suitable keywords within a web page.

FIG. 4 depicts a flow diagram of a method of identifying suitable keywords within a web page. Specifically, the method 400 of FIG. 4 is suitable for use in implementing steps 310, 320 and 330 of the method 300 of FIG. 3. It should be noted that while the embodiments discussed herein depict the utilization of several heuristic functions occurring in a particular order, more or fewer heuristic functions may be employed, the specific order of the heuristic functions employed may be changed, and other modifications to the identification method may be made.

The method 400 is entered at step 410, where predefined keywords associated with a web page are identified. Referring to box 415, these predefined keywords may comprise information within a title field, method keyword field, meta-description field, other field or tag within the web page being processed. As previously noted, within the context of various embodiments text-based data from either or both of the content and non-content portions of a webpage is selectively utilized to provide keyword data.

At step 420, potential keyword phrases are extracted. A keyword phrase comprises a plurality of adjacent words capable of operating as a keyword. If the component keywords of a potential keyword phrase are definable or otherwise make sense in some manner, then the component keywords form a valid keyword phrase. If the component keywords of a potential keyword phrase are not definable or are otherwise useless within the context of a keyword phrase, then the component keywords do not form a valid keyword phrase. Referring to box 425, keyword phrases may comprise delineated phrases where one or more words are separated by a comma, tab, semicolon, blank, space or linear.

In one embodiment where component keywords of potential keyword phrases are separated by a first delineator (e.g., a space or a blank), groups of potential keyword phrases are established in which each group comprises N adjacent keywords, where N comprises an integer greater than one. More than one size N may be used in this step. Thus, a first group of potential keyword phrases may be formed by combining each pair of adjacent component keywords to form respective potential keyword phrases (i.e., N=2). Similarly, a second group of potential keyword phrases may be formed by combining each triplet of adjacent component keywords to form respective potential keyword phrases (i.e., N=3).

In one embodiment where component keywords of potential keyword phrases are separated by a second delineator (e.g. a comma), potential keywords between any two instances of the second delineator are defined together as a potential keyword phrase. In a refinement of this embodiment, the component keywords between the two delineators are processed to form one or more groups of potential keyword phrases where each group comprises keyword phrases of a length N, as discussed above.

At step 430, the potential keyword phrases extracted at step 420 are evaluated to form a keyword list comprising only valid keywords and keyword phrases. Referring to box 435, this evaluation may be performed using a reference function or website such as provided by Wikipedia, dictionary or grammar correction provider, third-party evaluator, keyword or keyword phrase database and the like. That is, any of a spelling engine, a grammar engine and a search engine may be used to determine whether a potential unique keyword represents a valid phrase. The engine or software enabling the function may be from a third party, a standalone application and the like. Step 430 is directed towards determining whether or not a specific keyword phrase is suitable for use as a keyword within the context of the various embodiments. Nonsensical, erroneous and/or disallowed or disfavored keywords and keyword phrases are generally not useful within the context of web page descriptions.

As an example, if N=3 and three component keywords extracted at step 420 form the potential keyword phrase "new york times" in sequence, a search of the term "new york times" at Wikipedia will indicate that the keyword phrase "new york times" is valid.

At step 440, any stop words and extra words are removed from the keyword list. Stop words are words and/or phrases that are not particularly useful as keywords, such as common connectors, prepositions and the like. A list of stop words may comprise the following: "a, about, above, across, after, afterwards, again, against, all, almost, alone, along, already, also, although, always, am, among, amongst, amongst, amount, amp, an, and, another, any, anyhow, anyone, anything, anyway, anywhere, are, around, as, at, back, be, became, because, become, becomes, becoming, been, before, beforehand, behind, being, below, beside, besides, between, beyond, bill, both, bottom, but, by, call, can, cannot, cant, co, computer, con, could, couldn't, cry, de, describe, detail, do, done, down, due, during, each, e.g., eight, either, eleven, else, elsewhere, empty, enough, etc, even, ever, every, everyone, everything" and so on. Some stop words may have relevance within the context of phrases and, as such, are not removed if forming part of relevant phrase At step 450, a list of the identified keywords associated with the web page is provided, such as to a method step invoking the operation of the method 400 of FIG. 4 (e.g., steps 310, 320 or 330 of the method 300 of FIG. 3).

Figure 5:
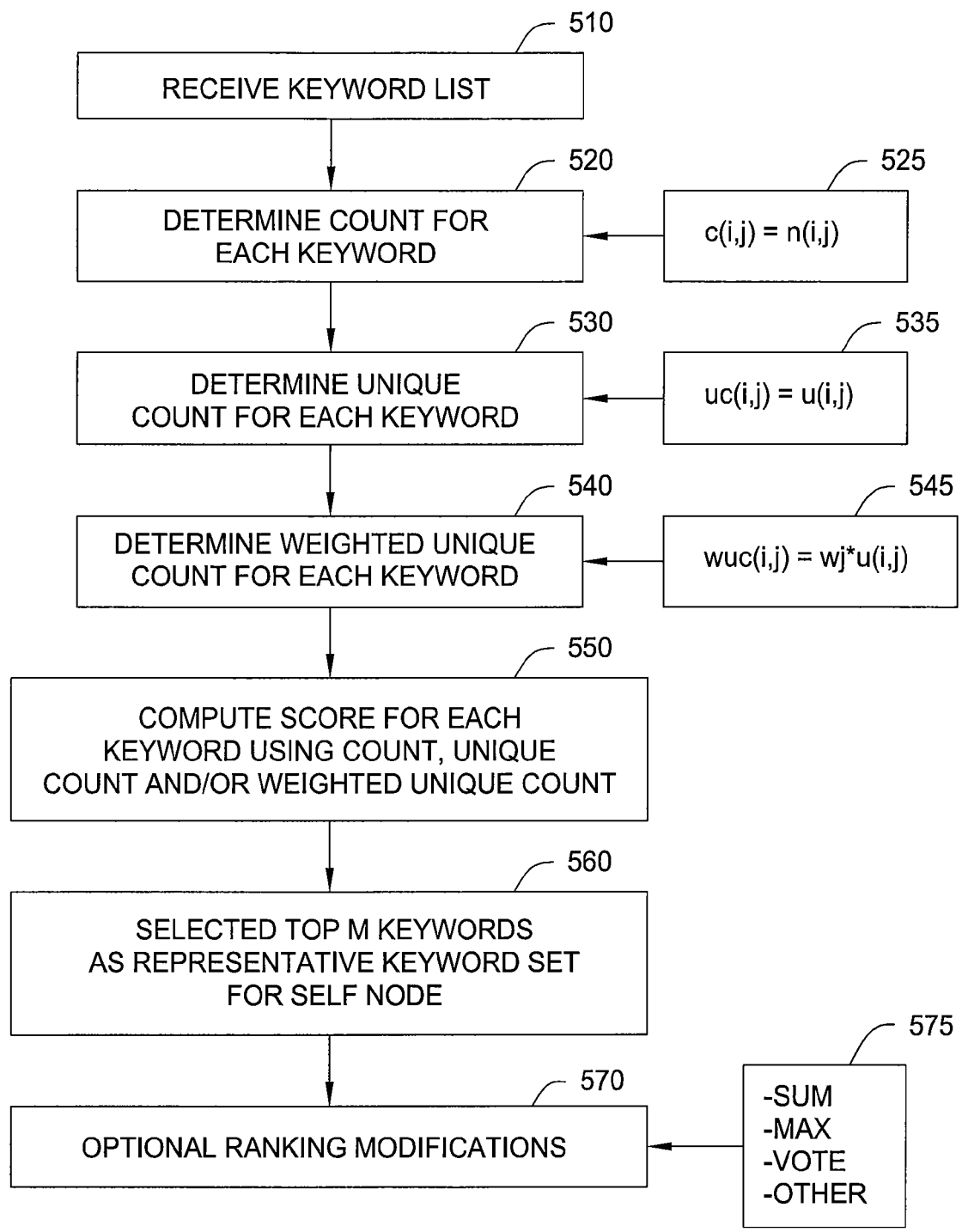
FIG. 5 depicts a flow diagram of a method of ranking keywords associated with a web page.

FIG. 5 depicts a flow diagram of a method of ranking keywords associated with a web page. Specifically, the method 500 of FIG. 5 is suitable for use in implementing steps 360/365 of the method 300 of FIG. 3. The method 500 contemplates using one or more of Count, Unique Count and/or Weighted Unique Count heuristic functions to generate a list of the M most prominent keywords within a list of keywords associated with a web page. Other heuristic functions may also be used within the context of the various embodiments. While the various heuristic functions discussed herein are presented as processing the same set of keyword data, it should be noted that other functions may be employed that operate on reduced or otherwise processed sets of keyword data.

The following notations are used:

$n(i, j)$ is the number of occurrences of a keyword $k_i$ in the document associated with node $j$.

$u(i, j)$ is set equal to 1 if the keyword $k_i$ appears in the document associated with node $j$, and is set to 0 otherwise.

$w_j$: is the weight of the link between the Self page and the node $j$.

The method 500 is entered at step 510 when a list of keywords is received (i.e., a list provided at step 360 of the method 300 of FIG. 3).

At step optional 520, a Count function is applied to each keyword. Referring to box 525, the Count function C is defined by the relationship:

$$C(i, j) = n(i, j)$$

At step optional 530, a Unique Count function is applied to each keyword. Referring to box 535, the Unique Count function UC is defined by the relationship:

$$UC(i, j) = u(i, j)$$

At step optional 540, a Weighted Unique Count function is applied to each keyword. Referring to box 545, the Weighted Unique Count function UC is defined by the relationship:

$$WUC(i, j) = w_j * u(i, j).$$

At step 550, a score is computed for each keyword $k_i$ using the Count, Unique Count and/or Weighted Unique Count heuristic functions.

At step 560, the top M keywords are selected as members of the keyword set associated with a web page being processed (i.e., a self web page). That is, the keyword set is then sorted based on the score of a keyword, and the top M keywords are selected as a representative Keyword_set for the Self node.

At optional step 570, the ranking of the keywords is further modified using (referring to box 575) one or more of a Sum, Max, Vote and/or other Composite Score function within top M keywords ki. Generally speaking, these and/or other composite score functions or heuristic functions may be applied to the initial keyword sets or keyword sets that have been processed using one or more heuristic functions. The Sum, Max and Vote Composite Score functions provide additional ranking adjustments to the ranked keyword set provided by the heuristic function ranking processes, as follows:

$$\text{Sum}(i) = \text{rank}(\text{score}(i, C)) + \text{rank}(\text{score}(i, UC));$$

$$\text{Max}(i) = \max(\text{rank}(\text{score}(i, C)), \text{rank}(\text{score}(i, UC)));$$
and $$\text{Vote}(i) = \text{majority vote of score}(i, C) \text{ and score}(i, UC).$$

In one embodiment, the composite score functions discussed above utilize an equation for the function "score(i,h)" as follows:

$$\text{score}(i,h) = \alpha \cdot h(i,\text{self}) + \beta \cdot \sum_{d_j \in \text{inlinks}} h(i,j) + \chi \cdot \sum_{d_j \in \text{outlinks}} h(i,j)$$

Where i represents a keyword under consideration, h is a heuristic function, $\alpha$ is a weight assigned to the self node (this may be the same as or different than w0 as discussed above), $\beta$ is a weight assigned to the in-link related keywords, $\chi$ is a weight assigned to the out-link related keywords, and h(ij) is the heuristic function result for the keyword i in the document associated with node j.

It is noted that the equation contemplates that the all of the self node related keywords are assigned a first weight $\alpha$, all of the in-link related keywords are assigned a second weight $\beta$, and all of the out-link related keywords are assigned a third weight $\chi$. However, the equation may be modified to provide that different keywords within the self, in-link and/or out-link keyword sets may have different assigned weight values.

In one embodiment, the relative importance or relative value of a keyword within the context of its respective set of keywords is determined using one or more of the heuristic functions. Thus, a keyword exhibiting a greater count C, unique count UC and/or weighted unique count WUC may be deemed to be correspondingly more important of valued than other keywords.

In one embodiment, the weight assigned to a keyword comprises the sum of the heuristics associated with that keyword in each of the self, in-link and out-link sets of keywords. For example, if the word "car" occurs 5 times in the self page, 10 times in the in-link pages, and 1 time in the out-link pages, then "car" is assigned a weight of 16 (i.e., 5+10+1).

Figure 6:
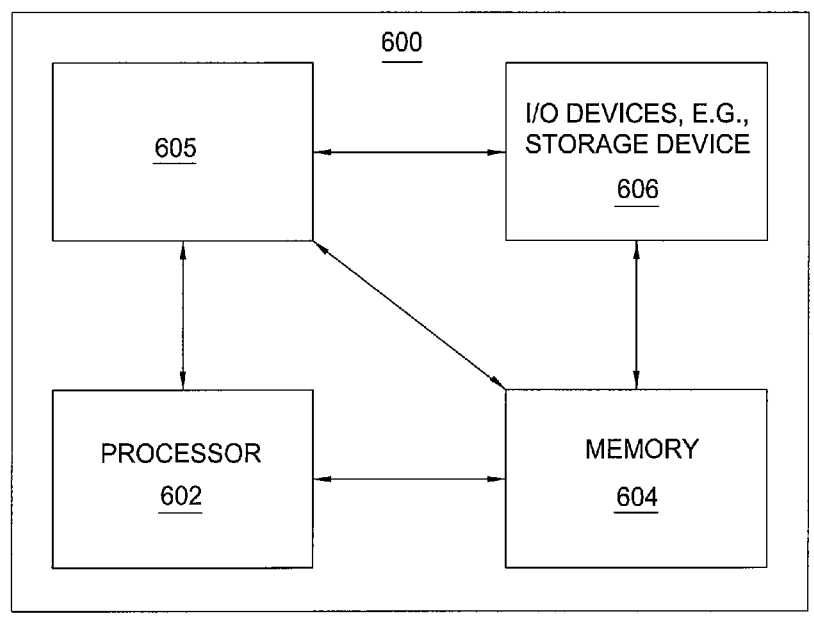
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 includes a processor element 602 (e.g., a central processing unit (CPU)), a memory 604, e.g., random access memory (RAM) and/or read only memory (ROM), a descriptor management module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present descriptor management process 605 can be loaded into memory 604 and executed by processor 602 to implement the functions as discussed hereinabove. As such, descriptor management process 605 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions. Thus, one embodiment comprises an apparatus including a memory for storing software instructions and a processor for executing the software instructions, wherein the software instructions when executed by the process cause the apparatus to perform a method for assigning keywords to a web page according to the various embodiments discussed herein.

As discussed herein, keyword assignment to web pages is a very important problem, finding applicability within the context of user profile generation, web site categorization and filtering (e.g., WebSense), search engine (e.g., Google), keyword research (e.g., AdSense) and so on. The above embodiments provide novel methods, systems and apparatus for keyword assignment that uses data, meta-data and so on associated with multiple web pages to assign a set of representative keywords to a web page. Advantageously, the various embodiments provide a relatively lightweight (computationally efficient and memory efficient) method when only the meta-data of the pages is analyzed and the content is ignored. The techniques are robust in that keywords are learned not only from the self page but also from its "neighbor" pages.

Example of Computationally Efficient Embodiment

As an example, the Kelley Blue Book™ automobile valuation website page (www.kbb.com) is evaluated according to one embodiment of the invention to produce keyword assignment data provided below in tabular form in Table 1. Specifically, the top 10 (i.e., M=10) keywords processed according to the embodiments of FIGS. 3-5 are provided below with respect to Table 1. The raw data used by the various processes is also provided below. The parameters used in the example are as follows:

| | |
|---|---|
| URL | www.kbb.com. |
| Weights | self = 10; Outlinks = 2; Inlinks = 1. |
| In-link Source | Yahoo (this could be Google, Bing, a service provider's crawler and/or others search engines or crawlers). |

The rank ordered result for the top 10 keywords (out of 239 in the example) is provided below with respect to Table 1.

| Rank | Vote | | Sum | | Max | | Weighted U-Count | | Count | |
|---|---|---|---|---|---|---|---|---|---|---|
| 1 | book | 2 | book | 583 | kelley | 293 | kelley | 32 | car | 253 |
| 2 | blue book | 2 | blue book | 583 | car | 293 | book | 32 | blue book | 161 |
| 3 | kelley | 2 | kelley | 581 | book | 292 | blue book | 32 | book | 159 |
| 4 | car | 2 | car | 581 | blue book | 292 | blue | 32 | blue | 159 |
| 5 | blue | 2 | blue | 580 | blue | 290 | kelley blue book | 30 | new | 87 |
| 6 | kelley blue book | 2 | kelley blue book | 574 | new | 289 | car | 29 | kelley | 84 |
| 7 | use | 2 | use | 572 | kelley blue book | 289 | kelley blue book | 26 | use | 59 |
| 8 | review | 2 | new | 571 | use | 287 | kelly | 26 | review | 56 |
| 9 | new | 1 | review | 570 | kelley blue book | 287 | use | 24 | kelley blue book | 56 |
| 10 | kelley blue book | 1 | price | 565 | review | 286 | review | 24 | price | 55 |

The keyword lists extracted from the Self, Out-link and In-link pages are provided as follows (lists limited to only 3 out-links and 3 in-links for simplicity):

Self (http://www.kbb.com)

New Cars, Used Cars, Blue Book Prices & Car Values—Kelley Blue Book
URL: http://www.kbb.com
Title: ['new', 'car', 'new cars', 'used cars', 'blue', 'blue book', 'book', 'price', 'blue book prices', 'car', 'values', 'car values', 'kelley', 'blue', 'blue book', 'book', 'kelley blue book']
Meta-keywords: ['car', 'car', 'new', 'car', 'new cars', 'used cars', 'vehicle', 'vehicle', 'auto', 'automobile', 'automobile', 'blue', 'blue book', 'book', 'book value', 'value', 'blue book value', 'kelley', 'blue', 'blue book', 'book', 'kelley blue book', 'kelly', 'blue', 'blue book', 'book', 'kelly blue book', 'kbb']
Meta-description: ['kelley', 'blue', 'blue book', 'book', 'trust', 'resource', 'price', 'values', 'review', 'new', 'car', 'use', 'car', 'buying', 'selling', 'car', 'visit', 'visit kbb.com']

Outlinks

1. Kelley Blue Book
URL: http://www.kbb.com/kbb/search/searchresult.aspx
Title: ['kelley', 'blue', 'blue book', 'book']
Meta-keywords: []
a Meta-description: []
2. New Car—New Car Prices & Reviews—Kelley Blue Book
URL: http://www.kbb.com/kbb/NewCars
Redirected: http://www.kbb.com/kbb/NewCars/
Title: ['new', 'car', 'new car', 'new', 'car', 'price', 'new car prices', 'review', 'kelley', 'blue', 'blue book', 'book', 'kelley blue book']
Meta-keywords: ['new', 'car', 'new car', 'new', 'car', 'price', 'new car prices', 'car', 'price', 'car price', 'new', 'car', 'pricing', 'new car pricing', 'new', 'car', 'price', 'new car price', 'car', 'price', 'car price', 'vehicle', 'price', 'vehicle price', 'kelley', 'blue', 'blue book', 'book', 'kelley blue book', 'kelly', 'blue', 'blue book', 'book', 'kelly blue book', 'kbb']
Meta-description: ['kelley', 'blue', 'blue book', 'book', 'trust', 'resource', 'new', 'car', 'price', 'research', 'compare', 'new', 'car', 'pricing', 'read', 'review', 'read reviews', 'rating', 'browse', 'video', 'local', 'dealer']
3. Used Car—Used Car Prices, Used Car Values & Reviews—Kelley Blue Book
URL: http://www.kbb.com/kbb/UsedCars
Redirected: http://www.kbb.com/kbb/UsedCars/
Title: ['used car', 'use', 'used car', 'car', 'price', 'used car prices', 'use', 'used car', 'car', 'values', 'used car values', 'review', 'kelley', 'blue', 'blue book', 'book', 'kelley blue book']
Meta-keywords: ['used car', 'usedcars', 'use', 'vehicle', 'used vehicle', 'use', 'vehicles', 'used vehicles', 'use', 'used car', 'car', 'price', 'used car prices', 'blue', 'blue book', 'book', 'book values', 'values', 'blue book values', 'use', 'used car', 'car', 'pricing', 'used car pricing', 'use', 'used car', 'car', 'values', 'used car values', 'use', 'used car', 'car', 'value', 'used car value', 'car', 'worth', 'car', 'kelley', 'blue', 'blue book', 'book', 'kelley blue book', 'kelly', 'blue', 'blue book', 'book', 'kelly blue book', 'kelly', 'blue', 'blue book', 'book', 'kellys blue book']
Meta-description: ['kelley', 'blue', 'blue book', 'book', 'trust', 'resource', 'use', 'used car', 'car', 'price', 'values', 'research', 'latest', 'blue', 'blue book', 'book', 'use', 'used car', 'car', 'values', 'read', 'review']

Inlinks

1. Reference, Facts, News—Free and Family-Friendly Resources—Refdesk.com
URL: http://www.refdesk.com/
Title: ['reference', 'fact', 'news', 'free', 'family-friendly', 'resource']
Meta-keywords: ['reference', 'fact', 'news', 'family', 'friendly', 'family friendly', 'refdesk']
Meta-description: ['refdesk', 'free', 'family', 'friendly', 'web', 'web site', 'site', 'index', 'review', 'quality', 'credible', 'current', 'web-based', 'reference', 'resource']

2. CEOExpress: Business Portal for Executives Created by a Busy Executive
URL: http://www.ceoexpress.com/
Redirected: http://www.ceoexpress.com/default.asp
Title: ['ceoexpress', 'business', 'portal', 'executive', 'create', 'busy', 'executive']
Meta-keywords: ['business', 'links', 'business links', 'ceo', 'chief executive officer', 'senior', 'executive', 'senior executives', 'ceo', 'links', 'ceo links', 'business', 'portal', 'business portal', 'business', 'directory', 'business directory', 'small', 'business', 'directory', 'small business directory', 'ceo', 'homepage', 'ceo homepage', 'cfo', 'portal', 'cfo portal', 'cfo', 'links', 'cfo links', 'cio', 'portal', 'cio portal', 'cio', 'links', 'cio links', 'international', 'business', 'portal', 'international business portal', 'c-level']
Meta-description: ['ceoexpress', 'business', 'portal', 'executive', 'create', 'ceo']
3. Auto Warranty: Extended Warranty Quotes Online
URL: http://www.warrantyheadquarters.com/
Title: ['auto', 'warranty', 'auto warranty', 'extend', 'warranty', 'quote', 'online']
Meta-keywords: ['auto', 'warranty', 'auto warranty', 'auto', 'warranty', 'research', 'auto warranty research', 'extend', 'warranty', 'extended warranties', 'vehicle', 'maintenance', 'vehicle maintenance', 'coverage', 'plan', 'coverage plans', 'coverage', 'car']
Meta-description: ['auto', 'warranty', 'auto warranty', 'receive', 'extend', 'auto', 'warranty', 'quote', 'instantly', 'have', 'provide', 'personal', 'information', 'discount', 'pricing', 'great', 'service']

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for assigning keywords to a web page to form thereby a set of web page representative keywords, comprising:
    identifying self keywords associated with the web page to form thereby a set of identified self keywords, the self keywords comprising keyword data from the web page;
    identifying in-link keywords associated with the web page to form thereby a set of identified in-link keywords, the in-link keywords comprising keyword data from other web pages including a link to the web page;
    identifying out-link keywords associated with the web page to form thereby a set of identified out-link keywords, the out-link keywords comprising keyword data from other web pages having a link to said other web pages from the web page;
    extracting, from each of the sets of identified self, in-link and out-link keywords, a plurality of potential keyword phrases, each keyword phrase comprising at least two keywords within a respective set of keywords;
    evaluating each of the identified keywords in each of the set and extracted keyword phrases according to a reference function to determine thereby valid keywords and keyword phrases;
    assigning weights to each of the valid self, in-link and out-link keywords and keyword phrases to form a set of weighted keywords and keyword phrases associated with the web page, wherein each of the valid in-link and out-link keywords and keyword phrases is assigned a weight according to a ranking of a respective source web page; generating a rank ordered of the valid keywords using one or more of count, unique count and weighted unique count heuristic functions; and
    combining, in the rank order, the valid self, in-link and out-link keywords and keyword phrases to form a set of web page representative keywords and keyword phrases associated with the web page separated by first delineators and stored in a memory.

2. The method of claim 1, further comprising:
    processing the valid self, in-link and out-link keywords and keyword phrases to provide respective rank ordered sets of self, in-link and out-link keywords and keyword phrases, wherein said valid self, in-link and out-link keywords and keyword phrases are combined in rank order.

3. The method of claim 1, further comprising:
    determining, using one or more heuristic functions, a relative importance of each of the valid self, in-link and out-link keywords and keyword phrases, wherein said valid self, in-link and out-link keywords and keyword phrases are combined in order of importance.

4. The method of claim 1, wherein identified keyword data comprises data from non-content portions of a web page.

5. The method of claim 1, wherein identified keyword data comprises data from one or more of a title field, a meta-keyword field and a meta-description field.

6. The method of claim 1, further comprising:
    identifying as potential keyword phrase any occurrences of one or more words in the self, in-link and out-link keyword lists separated by the first delineator.

7. The method of claim 6, wherein said first delineator comprises one of a comma, semicolon, tab and NULL character.

8. The method of claim 1, further comprising:
    identifying as potential keyword phrase any occurrences of N adjacent space-separated words in the self, in-link and out-link keyword lists, where N is an integer greater than one.

9. The method of claim 1, wherein any of a spelling engine, a grammar engine and a search engine are used to perform said evaluating.

10. The method of claim 1, wherein source web page rankings are determined by using a search engine.

11. The method of claim 1, wherein source web page rankings are determined according to a number of common related links pointing to the self page.

12. The method of claim 1, wherein valid in-link keywords and keyword phrases associated with web pages are identified using one or more of a web crawler and a search engine.

13. The method of claim 12, wherein valid in-link keywords associated with the web page are updated as the in-link keyword associated with web pages are identified.

14. The method of claim 1, wherein out-link keyword web pages are identified using href data.

15. The method of claim 14, wherein the href data associated with an image is excluded from keywords lists.

16. The method of claim 1, further comprising ranking the collected keywords according to respective link weights.

17. Apparatus comprising a memory for storing software instructions and a processor for executing the software instructions, wherein the software instructions when executed by the process cause the apparatus to perform a method for assigning keywords to a web page to form thereby a set of web page representative keywords, the method comprising:
    identifying self keywords associated with the web page to form thereby a set of identified self keywords, the self keywords comprising keyword data from the web page;

identifying in-link keywords associated with the web page to form thereby a set of identified in-link keywords, the in-link keywords comprising keyword data from other web pages including a link to the web page;

identifying out-link keywords associated with the web page to form thereby a set of identified out-link keywords, the out-link keywords comprising keyword data from other web pages having a link to said other web pages from the web page;

extracting, from each of the sets of identified self, in-link and out-link keywords, a plurality of potential keyword phrases, each keyword phrase comprising at least two keywords within a respective set of keywords;

evaluating each of the identified keywords in each of the set and extracted keyword phrases according to a reference function to determine thereby valid keywords and keyword phrases;

assigning weights to each of the valid self, in-link and out-link keywords and keyword phrases to form a set of weighted keywords and keyword phrases associated with the web page, wherein each of the valid in-link and out-link keywords and keyword phrases is assigned a weight according to a ranking of a respective source web page; generating a rank ordered of the valid keywords using one or more of count, unique count and weighted unique count heuristic functions; and combining, in the rank order, the valid self, in-link and out-link keywords and keyword phrases to form a set of web page representative keywords and keyword phrases associated with the web page separated by first delineators and stored in a memory.

18. The apparatus of claim 17, wherein the apparatus comprises a server in communication with a plurality of networked nodes.

19. A non-transitory computer-readable storage medium storing instructions which, when executed by a computer, cause the computer to perform a method, the method comprising:

identifying self keywords associated with the web page to form thereby a set of identified self keywords, the self keywords comprising keyword data from the web page;

identifying in-link keywords associated with the web page to form thereby a set of identified in-link keywords, the in-link keywords comprising keyword data from other web pages including a link to the web page;

identifying out-link keywords associated with the web page to form thereby a set of identified out-link keywords, the out-link keywords comprising keyword data from other web pages having a link to said other web pages from the web page;

extracting, from each of the sets of identified self, in-link and out-link keywords, a plurality of potential keyword phrases, each keyword phrase comprising at least two keywords within a respective set of keywords;

evaluating each of the identified keywords in each of the set and extracted keyword phrases according to a reference function to determine thereby valid keywords and keyword phrases;

assigning weights to each of the valid self, in-link and out-link keywords and keyword phrases to form a set of weighted keywords and keyword phrases associated with the web page, wherein each of the valid in-link and out-link keywords and keyword phrases is assigned a weight according to a ranking of a respective source web page; generating a rank ordered of the valid keywords using one or more of count, unique count and weighted unique count heuristic functions; and combining, in the rank order, the valid self, in-link and out-link keywords and keyword phrases to form a set of web page representative keywords and keyword phrases associated with the web page separated by first delineators and stored in a memory.

\* \* \* \* \*